United States Patent [19]

Price et al.

[11] Patent Number: 4,599,759
[45] Date of Patent: Jul. 15, 1986

[54] TRANSFER APPARATUS

[75] Inventors: Frank C. Price, Leicester; Anthony M. White, Oadby, both of England

[73] Assignee: USM Corporation, Farmington, Conn.

[21] Appl. No.: 615,918

[22] Filed: May 31, 1984

[30] Foreign Application Priority Data

Jun. 10, 1983 [GB] United Kingdom ............... 8315953

[51] Int. Cl.⁴ ...................... A43D 11/00; B65G 47/02
[52] U.S. Cl. ..................... 12/1 A; 12/53.1; 198/436
[58] Field of Search ............... 219/215, 488; 12/1 R, 12/1 A, 1 W, 53.1; 414/750, 222; 198/436, 586

[56] References Cited

U.S. PATENT DOCUMENTS

| | | | |
|---|---|---|---|
| 2,307,413 | 1/1943 | Loux | 198/436 |
| 3,325,435 | 11/1967 | Reinecke | 198/436 |
| 4,304,020 | 12/1981 | Bonnet et al. | 12/1 A |
| 4,369,536 | 1/1983 | Hanson et al. | 12/1 A |
| 4,423,530 | 1/1984 | White | 12/1 A |
| 4,517,442 | 5/1985 | Price et al. | 219/215 |
| 4,529,081 | 7/1985 | Tanaka | 198/436 |
| 4,531,626 | 7/1985 | Toriyabe | 198/436 |

Primary Examiner—Werner H. Schroeder
Assistant Examiner—Steven N. Meyers
Attorney, Agent, or Firm—Spencer T. Smith

[57] ABSTRACT

The transfer apparatus comprises a transfer arm (16) and a distributor (18). The transfer arm has two axes of movement (22,26) and is non-extendable so that it moves between a take-off station and an intermediate station (I) through a fixed distance. The distributor (18) has a table (50) which receives a shoe (S) at the intermediate station (I). Furthermore, the table (50) can be positioned at any one of four stations (I,F1,F2,F3) each aligned with a channel (12) of a heat setting apparatus (14). A pneumatic control circuit causes shoes (S) fed successively to the table (50) to be transferred in a sequence to the channels (12) by operation of pusher means.

The apparatus is suitable for transferring shoes from a lasting machine, a shoe support (10) of which can be positioned at the take-off station, to a heat setting apparatus (14).

3 Claims, 2 Drawing Figures

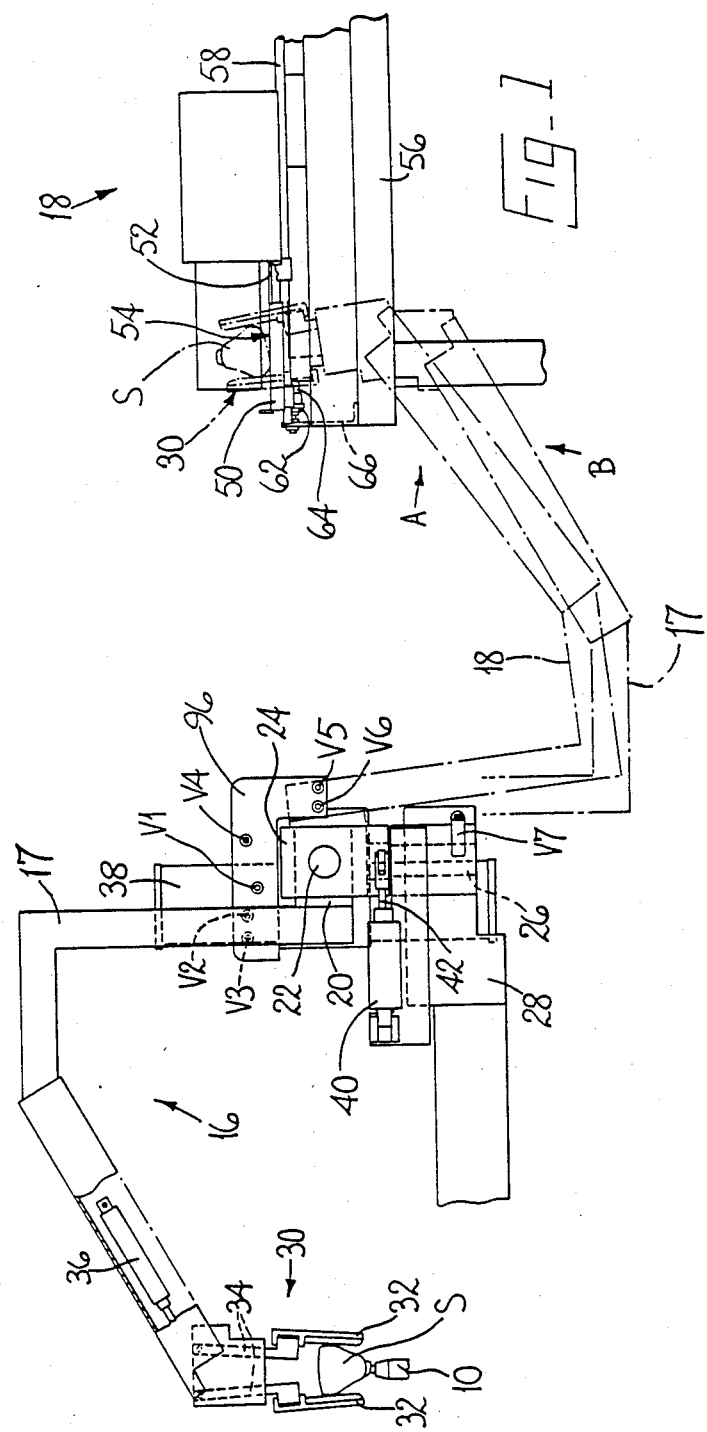

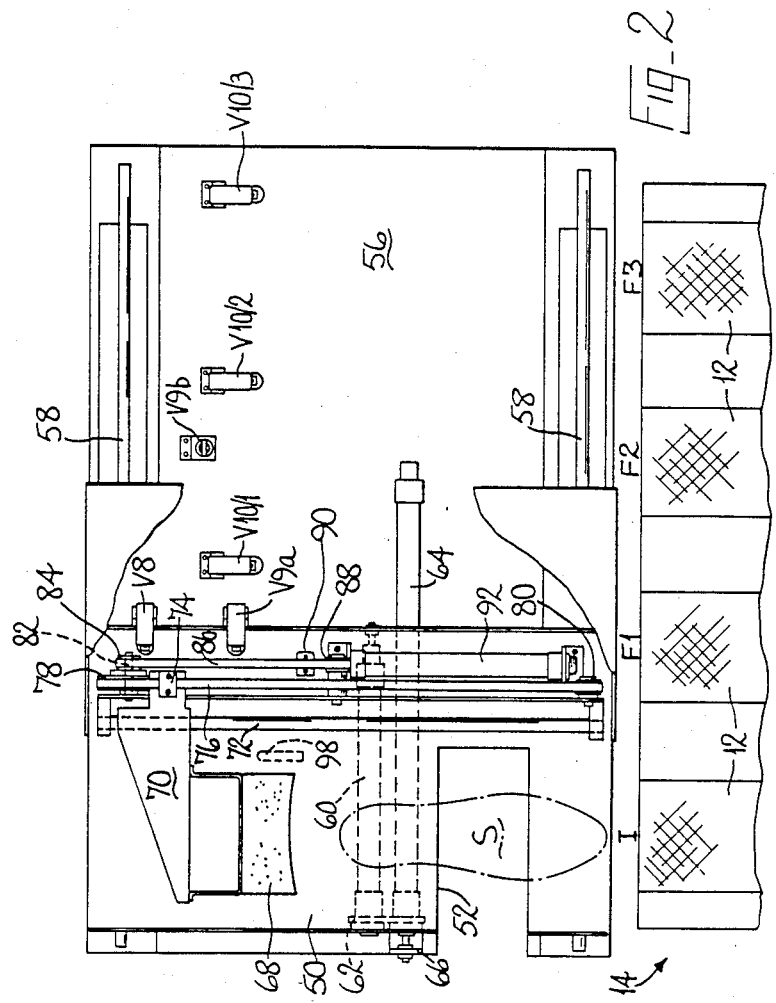

TRANSFER APPARATUS

BACKGROUND OF THE INVENTION

1. Field of the Invention

This invention is concerned with a transfer apparatus for transferring articles from a take-off station to a selected one of a plurality of receiving stations, and is especially, but not exclusively, suitable for use in the manufacture of shoes.

2. Prior Art

Transfer apparatus of the aforementioned type, though not necessarily for use in the shoe industry, is known, comprising a multi-axis "robot" arm, in the operation of which the arm may extend telescopically or be constituted by a number of links pivotally connected together for providing an extension of the reach of the arm, or indeed may be moved bodily, so as to enable articles transferred thereby to be deposited at different receiving stations. The greater the reach of the arm and also the greater the number of axes with which it is provided not only increases the overall cost of the apparatus, but also increases significantly the bulk of the arm and its consequent inertia. Thus, the rate at which energy is consumed in operating such arms tends to be high and furthermore the speed of operation tends to be relatively low.

It is thus the object of the present invention to provide an improved transfer apparatus which is relatively inexpensive and which does not have the problems of inertia of the type referred to above.

BRIEF SUMMARY OF THE INVENTION

The invention thus provides a transfer apparatus for transferring articles from a take-off station to a selected one of a plurality of receiving stations, comprising a transfer arm movable between the take-off station and an intermediate station, at which an article picked off the take-off station by the arm is deposited on a support surface, and a distributor which comprises (i) a table providing the support surface, the table being movable between the intermediate station and a plurality of further stations, at least each of which latter the table is aligned with one of the receiving stations of the apparatus, and (ii) a pusher, operable when the table is aligned with a receiving station, for moving an article on the support surface from the surface on to such receiving station.

By using such an arrangement, a non-extendable transfer arm can be utilized, since the distance between the take-off station and the intermediate station at which the article is deposited can now be fixed, so that the weight, and thus the inertia, of the arm is reduced as compared with an extendable arm, with consequent savings in the amount of energy required and the time taken for moving the arm between said stations. Furthermore, the distributor can now also be of relatively simple construction, with a relatively simple control arrangement for controlling the movement of the table between the various stations, and in this way too the overall cost of the apparatus can be significantly reduced without any unacceptable loss of accuracy.

In some applications, it may be desirable for the article to be inverted between the take-off station and its receiving station and preferably, in the apparatus in accordance with the invention, such inversion takes place as the transfer arm is moved from the take-off station to the intermediate station.

The transfer arm is preferably a two-axis device, that is to say the transfer arm is mounted for pivotal movement about a horizontal axis, power means being provided for moving the transfer arm about the axis between said take-off and intermediate stations, and further the transfer arm is also mounted for pivotal movement about a vertical axis, further power means being provided for moving the transfer arm about the vertical axis.

It will be appreciated that the inversion of an article can readily take place, where the transfer arm has a pick-up arrangement which is in a fixed relationship with the arm, by moving the arm through 180° about its horizontal axis. The facility for pivotal movement about a vertical axis allows some flexibility in the positioning of the receiving stations in relation to the take-off station. Furthermore, this latter facility may be useful where, after an article has been lifted from the take-off station some lateral movement may be required, e.g. to avoid collision with machine parts associated with either the take-off station or the intermediate station.

Preferably the table providing the support surface has a cut-away portion through which an end portion of the transfer arm can pass, thus to deposit an article carried by the arm on the surface. In the operation of the apparatus, conveniently the transfer arm is arranged to move to the intermediate station and, as the article carried thereby is deposited on the support surface, the pick-up arrangement releases it, the arm then continuing its movement to an out-of-the-way position. Upon removal of the article from the table by means of the pusher, or indeed upon movement of the table to one of the further stations, the return movement of the transfer arm can take place.

If desired, when the table is at the intermediate station, it is also aligned with a receiving station. By this provision, movement of the table to bring the article supported thereby to a receiving station may be reduced for all the further stations, as well as being omitted when the article is to be supplied to the receiving station aligned with the intermediate station.

Preferably, in the operation of the apparatus articles are transferred successively to the support surface, the table being at the intermediate station to receive them, and the table, with an article supported on its support surface, is aligned with the receiving stations in a sequence, so that the articles are transferred sequentially to the receiving stations. The sequence in which the articles are transferred to the receiving stations is predetermined, appropriate control means, e.g. pneumatic circuitry, being provided for both setting up and actuating the sequencing.

Each of the further stations, and also the intermediate station, may be provided with its own associated pusher, but preferably a single pusher is provided and this is mounted for movement with the table. In this way, the cost of the apparatus may be reduced, according to the number of stations incorporated.

As previously stated, the apparatus in accordance with the invention is especially, but not exclusively, suitable for use in the manufacture of shoes, more especially in inter-connecting two shoe making machines which have previously required loading and unloading individually by the operator. One such arrangement involves the transfer of shoes to a so-called heat setting apparatus, which is an apparatus for applying heated air to shoe uppers, after they have been lasted, in order to relieve the stresses in the shoe upper material created by a previous lasting operation. Thus, the invention provides, in another of its several aspects, apparatus for use in heat setting lasted shoe uppers comprising a plurality of substantially enclosed channels provided along side portions thereof with air inlets, a conveyor for conveying lasted shoes along the channels past the air inlets, and means for controlling the velocity and temperature of air blown through the air inlets and caused to impinge on the shoes, wherein each channel has at its "downstream" end a receiving station at which a lasted shoe can be placed on the conveyor for conveying along the channel, and wherein a transfer apparatus as set out above is provided for transferring lasted shoes from a shoe take-off station to a selected one of the receiving stations.

More particularly, the invention is applicable in an apparatus as set out in the last preceding paragraph in combination with a shoe lasting machine, having a shoe support which is located on the take-off station at the end of an operating cycle. Where the shoe lasting machine supports a shoe bottom uppermost, inversion of the shoe will take place to position it bottom down on the conveyor of the heat setting apparatus. Where, on the other hand, the shoe lasting machine is a toe lasting machine, which conventionally operates bottom down, no such inversion will be required.

BRIEF DESCRIPTION OF THE DRAWINGS

There now follows a detailed description, to be read with reference to the accompanying drawings, of one apparatus in accordance with the invention, which apparatus has been selected for description merely by way of exemplification of the invention and not by way of limitation thereof.

In the accompanying drawings:

FIG. 1 is a fragmentary front view showing details of a transfer arm of the transfer apparatus in accordance with the invention; and FIG. 2 is a plan view showing details of a distributor of the apparatus.

DESCRIPTION OF THE PREFERRED EMBODIMENTS

The transfer apparatus now to be described is especially, but not exclusively, suitable for use in transferring lasted shoes S from a shoe support 10 of a lasting machine, e.g. a side lasting machine in which the shoe S is supported bottom uppermost, sequentially to the channels 12 (FIG. 2) of a heat setting apparatus generally designated 14. To this end, the transfer apparatus comprises a transfer arm generally designated 16 (and shown in FIG. 1) and a distributor generally designated 17 (shown chiefly in FIG. 2).

The transfer arm 16 comprises a fabricated metal arm 18 which is mounted on a bracket 20 for pivotal movement about a horizontal axis provided by a shaft 22 which is supported in a bifurcated block 24 itself mounted for pivotal movement about a vertical axis provided by a vertical shaft 26. The shaft 26 is mounted in a frame 28 which may be freestanding, or which may be bolted or otherwise secured to the frame of the lasting machine or of the distributor 17. At the end of the arm 18, remote from its pivot 22, is provided a pick-off device generally designated 30 comprising two clamp pads 32 each carried at the lower end of a lever 34, the two levers 34 being pivotally mounted on the arm 18 and caused to pivot under the action of a piston-and-cylinder arrangement 36 itself carried by the arm 18. Operation of the arrangement 36 is thus effective to cause the clamp pads 32, when positioned at either side of a lasted shoe S on the shoe support 10, to close onto the shoe to remove it from the shoe support.

For pivoting the arm about the shaft 22, a piston-and-cylinder arrangement 38 is provided, bolted or otherwise secured to the frame 28 and effecting rotation of the shaft 22 via any suitable means, e.g. a rack-and-pinion arrangement (not shown). In the apparatus now being described, the stroke of the arrangement 38 is such that the arm 18 can pivot about the shaft 22 through approximately 180°.

For pivoting the arm about the shaft 26, a further piston-and-cylinder arrangement 40 is provided, also mounted on the frame 28, the piston rod 42 of the arrangement being connected to a lug formed on the bifurcated block 24. In the apparatus as shown, the piston-and-cylinder arrangement 40 has a relatively short stroke, and thus the arc through which the arm 18 can pivot about the vertical axis is a limited one, being sufficient to ensure that, after a lasted shoe S has been removed subtantially vertically from the shoe support 10, the arm can be moved forwardly in order to clear any overhanging portions of the lasting machine, by the operation of the arrangement 40. The latter arrangement is also effective, after the lasting machine has been cleared, to return the block 24 to its initial position. In other apparatus in accordance with the invention, however, it may be desirable for the arm to be rotated through a substantially larger arc, according to the disposition of the distributor 17 in relation to the lasting machine, and in such circumstances the arrangement 40 would be proviced with a correspondingly larger stroke.

The transfer arm 16 is thus effective to remove a lasted shoe S from the shoe support 10, which is located at a take-off station of the apparatus for this purpose, and to deposit the shoe S thus removed on a table 50 forming part of the distributor 17. The table 50 is provided with a cut-away portion 52, the width of which is sufficiently small to enable opposite ends of a shoe to be supported on the table, while allowing the pick-off device 30 of the transfer arm 16 to pass therethrough. In FIG. 1, the arm 18 is shown in full-line at the take-off station, while in the position indicated in chain-dot line and designated A it is shown in an intermediate position in which a shoe S carried thereby is deposited on a support surface 54 provided by the table 50, at which position, or just before it, the pick-off device 30 has just released the shoe. In the second position shown in chain-dot line and designated B, on the other hand, the pick-off device has been moved to an out-of-the-way position, the shoe having been released thereby.

The distributor 17 of the transfer apparatus in accordance with the invention comprises a frame 56 (FIG. 2) by which the distributor can be connected to either the lasting machine or the heat setting apparatus or both. The frame supports two guide rails 58 on which the table 50 can move between the intermediate station designated I and a selected one of a plurality of further stations designated F1, F2, F3. For moving the table 50 as aforesaid, a fluid pressure operated arrangement is used comprising a first piston-and-cylinder arrangement 60, the cylinder of which is supported by a bracket 62, and the piston rod of which is connected to the table 50, the stroke of the arrangement corresponding to the distance between two adjacent stations. The bracket 62 also supports one end of a further piston-and-cylinder arrangement 64, the piston rod of which is secured to a bracket 66 secured to the frame 56. The stroke of the arrangement 64 corresponds to twice the distance between adjacent stations. Thus, in the operation of the apparatus, the arrangement 60 is effective to move the table 50 from the intermediate station I to the first further station F1, the arrangement 64 is effective to move the table from the intermediate station I to the station F2, and the two arrangements 60,64 together are effective to move the table from the intermediate station I to the station F3.

The stations I, F1, F2, F3 are respectively aligned with four channels 12 of the heat setting apparatus 14.

Mounted for movement with the table 50 is a pusher comprising a shoe-engaging pad 68 which is carried by an arm 70 mounted for sliding movement along guide rails 72 extending along the length of the table 50. For moving the arm 70, a block 74 is secured thereto, which in turn is connected to a timing belt 76 which runs round two timing pulleys 78, 80 arranged at opposite ends of the table. The timing pulley 78 is carried on a shaft 82 on which is also carried a further timing pulley 84. The number of teeth of the pulleys 78, 84 is in the ratio 2:1 or greater. A further timing belt 86 is entrained round the pulley 84 and a further pulley 88, and further carries a block 90 which is connected to the piston rod of a piston-and-cylinder arrangement 92. The stroke of the arrangement 92 is such that, through the "gearing" of the pulleys 84, 78, a full stroke of the pad 70 is achieved. By this arrangement of timing belts and pulleys, the whole of the pusher means can be contained within the length of the table 50.

The apparatus in accordance with the invention is fluid pressure controlled, e.g. pneumatically controlled. To this end, the positions to which the transfer arm 18 and the table 50 are moved are controlled by valves, as will now be described.

In its rest condition, the transfer arm 16 is held out of the take-off station, the rest position being determined by valve V1 mounted on a plate 96 carried on the frame 28. In response to a signal from the lasting machine that the lasting operation is completed and the shoe support 10 has been moved to the take-off station, the arm 16 is moved to the take-off station under the action of the piston-and-cylinder arrangement 38, deceleration being effected upon engagement of the arm 18 with valve V2 and the arm being brought to rest at the station upon engagement of valve V3; valves V2, V3 are also mounted on the plate 96. Actuation of valve V3 is effective to actuate piston-and-cylinder arrangement 36, whereupon the pick-off device is actuated to clamp the shoe S, a pressure switch (not shown) being included in the sub-circuit incorporating the arrangement 36, which pressure switch, when actuated, causes piston-and-cylinder arrangements 38, 40 to be actuated, whereupon the shoe is raised from the shoe support 10 and, when clear thereof, is moved outwardly away from the lasting machine, thus to clear any overhanging portions of the machine; the stroke of the arrangement 40 is of course relatively limited.

As the arm passes through its arc about the axis 22, valve V4 on plate 96 is actuated, whereupon the arrangement 40 is reversed to swing the transfer arm 16 about its vertical axis 26 back to its initial condition, in which it is aligned with the cut-away 52 in the table 50.

As the shoe S approaches the cut-away, valve V5 is actuated to cause deceleration of the arm to take place, and thereafter valve V6 is actuated which de-actuates piston-and-cylinder arrangement 36 to release the shoe onto the table 50, while allowing the movement of the arm to continue through the cut-away 52 to its out-of-the-way position, in which valve V7 is actuated; valves V5, V6 are mounted on the plate 96, and valve V7 on the frame 28.

Actuation of valve V7 initiates operation of the circuit of the distributor 17. This circuit ensures that shoes S successively supplied to the table 50 are transferred in a sequence to the channels 12 of the heat setting apparatus 14. Thus, assuming that the next shoe S is to be loaded onto the first channel 12, actuation of valve V7 causes the pusher means to operate, whereby the pad 70 engages the shoe, under the action of piston-and-cylinder arrangement 92, to transfer it. The reversal of the arrangement 92, when the shoe has been transferred, is initiated by actuation of valve V8, located at the end of the stroke of the arrangement 92 and actuated by engagement therewith of the block 90. Furthermore, during the return travel of the pusher means, the block 90 actuates valve V9a, indicating that the pad 70 has cleared the cut-away, and actuating piston-and-cylinder arrangement 38 to return the transfer arm 16 to its rest condition. Actuation of valve V8, furthermore, sets up the pneumatic circuit so that, when a shoe is next supplied to the table 50, the latter will move to the first further station F1, aligned with the second channel 12 of the heat setting apparatus.

When the next shoe is then supplied, piston-and-cylinder arrangement 60 is actuated in response to actuation of valve V7 to bring the table to the first further station F1. Upon arrival at the station, furthermore, valve V10/1 is actuated by a block 98 on the underside of the table 50, causing piston-and-cylinder arrangement 92 to be operated, whereupon the pusher is operated as previously described. Instead of valve V9a initiating return of the transfer arm 16, however, in this case valve V9b is actuated, once the table has cleared the return path of the arm.

For moving the table to the second further station F2, or the third further station F3, the operation of the apparatus is the same as for the first further station F1, with the exception that the appropriate piston-and-cylinder arrangements 60, 64 are operated, and further valves V10/2 or V10/3 are effective to initiate operation of the pusher.

When the table has supplied a lasted shoe to the fourth channel 12, the sequencing sub-circuit is set up for the next shoe to be delivered once more to the first channel 12.

We claim:

1. An apparatus for heat setting lasted shoe uppers comprising:
a heat setting machine including a plurality of parallel channels for receiving a corresponding plurality of lasted shoe uppers, and
a lasted shoe distributor including
means for supporting a lasted shoe upper in line with one of said channels, said supporting means comprising a surface for supporting the heel portion of a supported lasted shoe upper and a surface for supporting the toe portion of a supported lasted shoe upper with an opening between said surface so that the portion of the supported lasted shoe upper between the toe and heel portions is unsupported whereby pick and place machinery can extend through the opening when placing a shoe upper on or picking up a shoe upper from said supporting surface, and means for displacing said supporting means to selectively locate the supported lasted shoe upper in line with each of the other channels, and means for pushing the supported lasted shoe upper into the channel with which it is aligned.

2. An apparatus for heat setting lasted shoe uppers comprising:

a heat setting machine including four equally spaced parallel channels for receiving a corresponding number of lasted shoe uppers, and a lasted shoe distributor including means for supporting a lasted shoe upper in line with one of said channels, means for displacing said supporting means to selectively locate the supported lasted shoe upper in line with each of the other channels, said displacing means including first means for moving said supporting means from a first position whereat the lasted shoe upper is in line with the first of said channels to a third position in line with the third of said channels, and second means for moving said supporting means, relative to said first means, a distance equal to the spacing between said channels whereby said supporting means can be located in line with either the second or fourth of said channels.

3. An apparatus according to claim 2 wherein said supporting means comprises a surface for supporting the heel portion of a supported lasted shoe upper and a surface for supporting the toe portion of a supported lasted shoe upper with an opening between said surfaces so that the portion of the supported lasted shoe upper between the tow and heel portions is unsupported.

* * * * *